United States Patent [19]

Sano et al.

[11] Patent Number: 5,510,195

[45] Date of Patent: Apr. 23, 1996

[54] RESIN MEMBRANE HAVING METALLIC LAYER AND METHOD OF PRODUCING THE SAME

[75] Inventors: Masakatsu Sano, Machida; Nobuo Katsuura, Sagamihara; Osamu Igarashi, Yokohama; Atsushi Nakayama, Kamakura; Toshihide Imamura; Kanichi Kadotani, both of Atsugi, all of Japan

[73] Assignees: Nikko Kogyo Kabushiki Kaisha; Komatsu Ltd., both of Tokyo, Japan

[21] Appl. No.: 842,705

[22] Filed: Feb. 27, 1992

[30] Foreign Application Priority Data

Mar. 1, 1991 [JP] Japan .................................. 3-059357
May 24, 1991 [JP] Japan .................................. 3-149349

[51] Int. Cl.$^6$ .............................. B32B 5/18; B32B 15/08
[52] U.S. Cl. .......................... 428/613; 428/626; 502/527
[58] Field of Search ................................. 428/626, 613; 502/527

[56] References Cited

U.S. PATENT DOCUMENTS

| | | | |
|---|---|---|---|
| 4,150,171 | 4/1979 | Feldstein | 427/54 |
| 4,540,490 | 9/1985 | Shibata et al. | 210/323.2 |
| 4,882,232 | 11/1989 | Bugnet et al. | 428/613 |

FOREIGN PATENT DOCUMENTS

| | | |
|---|---|---|
| 59-179108 | 10/1984 | Japan . |
| 60-28805 | 2/1985 | Japan . |
| 60-261502 | 12/1985 | Japan . |
| 61-135506 | 8/1986 | Japan . |
| 61-178902 | 11/1986 | Japan . |
| 63-152404 | 6/1988 | Japan . |
| 64-56106 | 3/1989 | Japan . |
| 1227971 | 4/1971 | United Kingdom . |
| 1261764 | 1/1972 | United Kingdom . |
| 1283192 | 7/1972 | United Kingdom . |
| 1329506 | 9/1973 | United Kingdom . |
| 1367444 | 9/1974 | United Kingdom . |
| 1489665 | 10/1977 | United Kingdom . |
| 1523145 | 8/1978 | United Kingdom . |
| 2005310 | 9/1978 | United Kingdom . |
| 2196022 | 4/1988 | United Kingdom . |
| 84/03465 | 9/1984 | WIPO . |

Primary Examiner—Wayne Langel
Attorney, Agent, or Firm—Fish & Richardson

[57] ABSTRACT

A porous hollow fiber membrane is dipped into either a high concentration alkali solution or a high concentration solution of chromic acid and sulfuric acid, etched and then dipped into a palladium ion solution. The membrane is then dipped into a solution containing reducing and complexing agents as well as metallic ions, and subjected to an electroless treatment. In this way, a porous hollow fiber membrane, to which a metallic layer is chemically bonded, can be obtained. The porous hollow fiber membrane is provided in which the bond strength between the membrane and the metallic layer and the amount of metal to be coated are increased. Because of a large amount of metal, it is possible to render the membrane sufficiently electrically conductive.

20 Claims, 22 Drawing Sheets

3

RESIN MEMBRANE HAVING METALLIC LAYER AND METHOD OF PRODUCING THE SAME

BACKGROUND OF THE INVENTION

1. Field of the Invention

The present invention relates to a resin membrane having a metallic layer and a method of producing such a membrane. More particularly, it pertains to a hollow fiber membrane and to a method of producing this membrane.

2. Description of the Related Art

Resin membranes formed of porous resin, particularly hollow fiber membranes (hereinafter referred to simply as membranes), have hitherto been widely used for filtering or removing various inclusions in liquids, such as blood, high-purity water, sterilized water, and the drain and condensate of thermal and nuclear power plants. Although such membranes prevent the permeation of bacteria, they themselves do not have bactericidal action; therefore, bacteria which have not been filtered may gradually accumulate and proliferate inside the membranes. Since the membranes are formed of an insulating resin, they tend to be charged electrostatically. When deposits are reversely charged, the adhesive force between the deposits and the membranes increases, thus increasing the frequency of the backwashing of the membranes and decreasing their life. Such a problem may become pronounced, particularly when cladding in the condensate and drain of thermal and nuclear power plants is purified.

To avoid such a drawback, there are a plurality of conventional membranes (disclosed in Japanese Patent Laid-Open Nos. 60-261502, 63-152404 and 64-56106) in which the surfaces of the membranes are coated with metals in order to provide the membranes with bactericidal action or electrical conductivity so that a build-up of an electric charge can be released.

However, when such a conventional membrane is metallized, plating, vacuum-evaporating and sputtering methods are used to simply attach metal to the membrane. It is therefore difficult to form a metallic layer in a sufficient amount on the membrane. At the same time, since bond strength is weak between the membrane and the metallic layer, the metallic layer easily peels off from the membrane. For example, it is possible that when the membrane is bent, the metallic layer will be readily peeled from the bent portion. Moreover, the amount of the metal adhering to the membrane is small. When this problem is considered together with the problem of the metallic layer being peeled off, the conventional membrane is insufficient for improving its bactericidal action and electrical conductivity. Because of a small amount of the metal adhering to the membrane, it is impossible to strengthen the membrane; consequently, there is a limit to the pressure resistance of the membrane.

To improve the efficiency of treatment using a plurality of membranes, the membranes have heretofore been fixed to make them into a module. Such modules are disclosed in Japanese Patent Laid-Open Nos. 59-179108 and 60-28805, and Japanese Utility Model Laid-Open Nos. 61-13556 and 61-178902. In these conventional modules, a plurality of membranes are bundled, and both ends of the membranes are fixed by an adhesive, such as epoxy or urethane resin, thus making the membranes into modules.

However, the wettability of the adhesive with respect to the membranes is poor, especially in olefin-system membranes. When wettability is poor, the membranes are fixed incompletely, thereby making it difficult to form into a module. Even after the module has been constructed, the strength between the adhesive and fixing portions is insufficient. As a result, liquid may undesirably leak in membrane modules, particularly those in which the liquid is passed through the membranes.

The conventional adhesive is mainly a thermosetting type: a main agent and a hardener are mixed uniformly, and in some cases, an inorganic filler may be added for use depending upon the circumstances. The adhesive must, of course, be deaerated and heated while controlling the temperature thereof because of the hardening time being long. Thermal strain may occur due to the gel time being too short or self-heating. It is thus difficult to control the adhesive which lacks in workability.

SUMMARY OF THE INVENTION

An object of the present invention is therefore to provide a resin membrane on which a metallic layer in a sufficient amount is formed, increasing bond strength between the metallic layer and resin. Another object of this invention is to provide a method of producing such a resin membrane. A further object is to provide a resin membrane module in which fixing portions of a plurality of resin membranes have enhanced strength.

This invention provides a resin membrane in which a metal is chemically bonded to a porous resin, whereby the bond strength is increased between the resin and a metallic layer and the amount of the metal coat layer is also increased. The resin is etched to chemically bond the metal to the resin. Etching is performed preferably using at least one of the following solutions: a high concentration alkali solution, a high concentration solution of chromic acid and sulfuric acid, a high concentration solution of sulfuric acid and nitric acid, and a solution of ammonium hydrogen fluoride and nitric type of resin.

When the etched resin is treated in a metallic salt solution, the metal is chemically bonded to the resin. The metallic layer comprises a catalytic metal including at least one of, for example, Pd and Sn, and comprises another layer made of at least one of, for example, Ni, Co, Fe, Mo, W, Cu, Re, Au or Ag, which substances are formed around the nucleus of Pd or Sn and used for an electroless plating which is electrolessly treated. A layer made of at least one of, for example, Cr, Zn, Ag, Au, Pt, Al, Mn, Bi, Se, Te, Cd, Ir, or Ti, mainly used for an electrolytic plating which is electrolytically treated, may also be formed on said metallic layer which is electrolessly treated. It is possible to form a metallic layer in a sufficient amount by etching and metallizing treatments.

A porous resin that produces functional groups capable of being chemically bonded to metals when it is etched is preferably used in this invention, and more particularly, at least one of polyacrylonitrile, polyarylate, polysulfone, phenoxy resin, polyamide-imide, polyethersulfone, ABS, polyethylene, polypropylene, polyamide, polyetherimide, acrylic urethane, polymide, silicone resin, or cellulose resin. Resin membranes refer to various types of membranes formed of porous resins, like flat and hollow fiber membranes. Such membranes, especially hollow fiber membranes, can be preferably used in this invention. A plurality of microporous pores are formed starting from the surface to the inside of the resin membrane. Because of the presence of these pores, the resin membrane can function as a filtering and separating membrane. In this instance, the inside diameter of the porous resin is 20–3000 μm, and preferably 500–1500 μ. The thickness of the resin is 5–1000 μ, and preferably 100–500 μ. The porosity of the resin is 3–15%, and preferably 5–7%.

This invention also provides a module to which a plurality of resin membranes having metallic layers are fixed by soldering. Solder with melting point lower than that of the membranes is preferably used.

The inventor of this invention has examined the mechanism in which when resin is etched and treated in a metallic salt solution, a metallic layer having high bond strength can be formed, and consequently, the following information is obtained. When the resin is etched in a high concentration solution, functional groups, such as carbon radicals, carboxyl groups (—COOH), carbonyl groups (—C=O), hydroxyl groups (—OH), sulfone groups (—SO$_3$H) and nitrile groups (—CN), which are capable of being chemically bonded to metal, are produced on the resin side. The functional groups are produced because of the dehydrogenation, oxidation, cleavage, hydrolysis, etc. of the resin. Such functional groups are bonded to metallic atoms or ions (M), whereby, for example, —CM, —COOM, —COM, —OM, —SO$_3$M, and —CMN are formed, and the metal is chemically bonded to the resin.

A description will now be given of the chemical bonding mechanism in which polypropylene is etched in a high concentration solution of chromic acid and sulfuric acid. As represented by the following formula 1, which is a reaction formula, oxygen in a nascent state is produced in the above mixed solution.

[Chemical Formula 1]

$$2CrO_3 + H_2O \rightarrow H_2Cr_2O_7$$

$$H_2Cr_2O_7 + 3H_2SO_4 \rightarrow Cr_2(SO_4)_3 + 4H_2O + O_2 + \cdot O$$

·O: oxygen in nascent state

As represented by the following chemical formula 2, which is a reaction formula, the oxygen in the nascent state oxidizes the tertiary carbon of polypropylene and turns it into hydroxyl groups. The hydroxyl groups form ammonium ions (NH$_4^+$) and ionic bonding in ammonia water. When they are reacted with metallic atoms or ions, metal (M) is substituted by the ammonium ions and electrically and chemically bonded to oxygen atoms. Chemical bonding of —COM is thus produced, with the result that the metal is chemically bonded to the resin membrane.

[Chemical Formula 2]
(in weak reaction conditions)

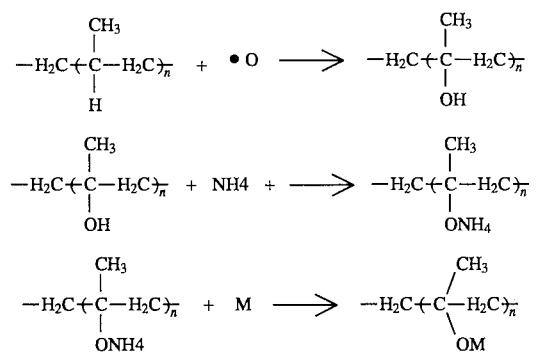

M: metal

When etching conditions become more severe, for example, when the concentration of chromic acid and sulfuric acid, or the reaction temperature increases, polypropylene cleaves, producing carboxyl groups, as represented by the following chemical formula 3, which is a reaction formula. In this case also, in the same manner as with chemical formula 2, metallic atoms or ions are electrically bonded to the carboxyl groups. Because of the production of —COOM, the metal is chemically bonded to the resin membrane. Chemical bonding between the metal and resin is thus produced in the boundary between the metallic layer and the resin membrane. Owing to such chemical bonding, the resin membrane is reliably coated with the metal, and bond strength of the metallic layer is increased much more than that of the conventional art.

[Chemical Formula 3]
(in strong reaction conditions)

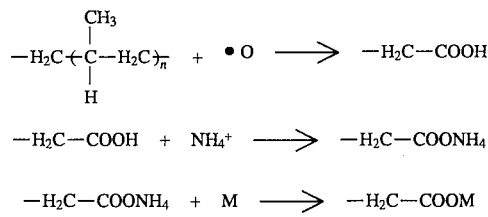

—H$_2$C—COOH + NH$_4^+$ ⟶ —H$_2$C—COONH$_4$

—H$_2$C—COONH$_4$ + M ⟶ —H$_2$C—COOM

M: metal

An etching treatment liquid must be a liquid which can form functional groups capable of chemically bonding the metal to the resin, and includes a high concentration solution of chromic acid and sulfuric acid; a high concentration solution of sulfuric acid and nitric acid; a high concentration strong base, such as sodium hydroxide or potassium hydroxide; a high concentration solution of ammonium hydrogen fluoride and nitric acid, etc. The etching treatment liquid must have high concentration because it forms the functional groups on the resin. More specifically, the etching treatment liquid includes a solution mixed with chromic acid, the concentration of which ranges from 30 to 50%, and sulfuric acid, the concentration of which ranges from 10 to 40%; 10–30% strong alkali; a solution mixed with 10–30% sulfuric acid and 10–30% nitric acid; and a solution mixed with 10–40% ammonium hydrogen fluoride and 40–70% nitric acid.

It is desirable for the resin to have a reaction zone capable of forming functional groups which can be chemically bonded to metal in the etching treatment liquid. More specifically, polypropylene having tertiary carbon; ABS having unsaturated bond; polysulfone *[1]; polyethersulfone *[2] having sulfonyl linkage of O=S=O, ether linkage of —C—O—C— silicone resin having $$-O-\underset{\underset{CH_3}{|}}{\overset{\overset{CH_3}{|}}{Si}}-O-\underset{\underset{CH_3}{|}}{\overset{\overset{CH_3}{|}}{Si}}-;$$

polyetherimide *[3] having ether linkage of —C—O—C—; phenoxy resin and cellulose resin having ether and hydroxyl groups; and polyacrylonitrile having nitrile groups, are especially desirable. Polyamide resin; polyamide-imide resin; polyetherimide resin; polyurethane resin such as acrylic urethane; and ester resin, such as polyarylate, which is hydrolyzed by being etched in a high concentration alkali solution to produce carboxyl groups, are also desirable.

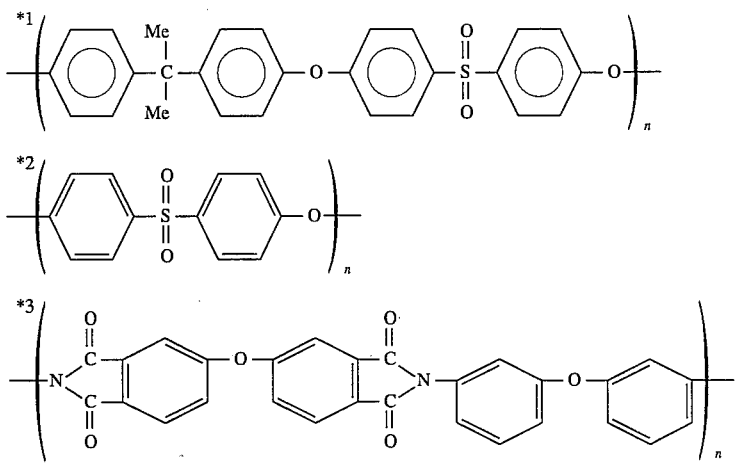

However, resin, such as polyethylene, which does not have the reaction zone, may also be used if it produces the functional groups because carbon is oxidized or a carbon-carbon linkage cleaves under more severe etching conditions. As described above, an etching treatment liquid depends upon the type of resin. When resins are used which originally have the functional groups capable of being chemically bonded to metal, such as polyacrylonitrile having nitrile groups, the metal can be chemically bonded to the resins, even if an etching step is omitted.

Preferably, electroless treatment is performed to chemically bond the metal to the resin membrane. Also preferably, a catalyst is introduced which promotes the reduction of the metal in the electroless treatment. More preferably, a catalytic metal, such as palladium or tin, which serves as a catalyst of the electroless treatment, is introduced. In such a case, the catalytic metal is first bonded to the resin membrane.

When a porous resin is etched as mentioned previously, the wettability of the metal on the porous resin improves with respect to the solution. The solution containing the catalytic metal is permeated into the pores and the catalytic metal is chemically bonded to the resin, as indicated by chemical formulae 1 and 2, which are reaction formulae. When such a resin is treated in a solution containing metallic ions, as well as complexing and reducing agents, the metallic ions are reduced on the surface of the catalytic metal. Because other metals are bonded to the catalytic metal, and for other reasons, a metallic layer is uniformly formed around the nucleus of the catalytic metal. The metallic layer is formed starting from the surface to the inside of such a resin serving as a functionally gradient material.

Since the catalytic metal is chemically bonded to the porous resin, the amount of the catalytic metal increases, so does the amount of the metal which can be subjected to the electroless treatment and formed into a layer. The amount of the metallic layer can be controlled by changing etching treatment time, the concentration of the etching treatment liquid and the amount of metallic atoms or ions.

A metallic salt for generating the metallic ions during the electroless treatment is not limited as long as it is a water-soluble one, such as sulfate, chloride or nitrate. At least one of, for example, Ni, Co, Fe, Mo, W, Cu, Re, Au, or Ag is subjected to the electroless treatment and used as a metal for coating a hollow fiber membrane. The amount of metal precipitation can be controlled by changing the temperature, the reaction time and the concentration of the metallic ions. The lower limit of the total amount of the metal coated on the resin membrane is determined by bactericidal action required for the resin membrane, the provision of electrical conductivity, strengthening the resin, and the solderability of the resin membrane. The upper limit of the total amount is determined so as not to block off the pores more than necessary. Well-known substances, such as formaline and dextrose, are used as a reducing agent, besides phosphorus compounds, such as sodium hypophosphite, and boron compounds, such as hydrogen boride. Substances capable of forming stable complexes together with the metallic ions are used as a complexing agent, and include well-known substances, such as ammonia, citric acid, tartaric acid, and oxalic acid.

This invention enables the bond strength between the metallic layer and the resin to be increased considerably while it serves as a functionally gradient material in which the metal is chemically bonded to the resin, thus penetrating into the surface as well as the inside of the resin membrane when the treatment liquid permeates into the pores. This invention also makes it possible to increase the thickness of the metallic layer to as much as 10–100% of the thickness of the resin membrane, and to increase the amount of the metal coating layer to approximately as much as $2.2 \times 10^{-3}$ to $15.0 \times 10^{-3}$ mol/m. The metallic layer containing a large amount of metal improves the stiffness and the required pressure resistance of the resin membrane. A large amount of metal improves the electrical conductivity of the resin membrane. The metallic layer is bonded to the resin inside the pores of the membrane, whereby a very large area is obtained which can be electrically conductive and act as a battery or an electrode.

The resin membrane which has thus obtained electrical conductivity can be subjected to electrolysis that enables other metals to be formed on the metallic layer (electroless treatment metallic layer) mentioned above. The second metals have various catalyses, such as polymerization, cracking, hydrogenation, dehydrogenation, isomerization, and cyclization. Consequently, the use application of the resin membrane can extend to the polymerization, cracking, hydrogenation, dehydrogenation, isomerization and cyclization of a reaction membrane, in addition to filtration and separation. At least one of, for example, Cr, Zn, Ag, Au, Pt, Al, Mn, Bi, Se, Te, Cd, Ir, Ti, or Ni can be electrolyzed. Because some metals to be subjected to the electroless treatment have catalyses, a resin membrane having a metallic layer formed of such a metal can be used as a reaction membrane.

When metallic layers are bonded to resin membranes, the resin membranes can be soldered to other resin membranes or metals. This fact is a great advantage when a plurality of membranes are made into a module. When a metallic layer in a sufficient amount can be reliably formed on each membrane as described in this invention, the metallic layer and solder are alloyed satisfactorily, thereby enhancing the solderability of the membrane. Membranes can be readily made into a module by soldering. Because of enhanced bond strength between the membrane and the metallic layer, it is possible to prevent the metallic layer from peeling off at the interface between the membrane and the solder and to fix the membrane completely and more reliably than in the conventional art.

A plurality of resin membranes, each having a metallic layer, are soldered to retaining plates and made into a module which is a preferred embodiment of this invention. Metallic plates, made of copper, brass or aluminium, are used as the retaining plates, to which the resin membranes are soldered.

A wide variety of well-known solders with a melting point ranging from 50° to 300° C. can be used for fixing the membranes having the metallic layers. Desirably, a solder with a melting point not exceeding that of a material forming the membranes is selected in order to avoid the deterioration of the membranes due to the application of heat during soldering. When membranes made of resin with low heat resistance are employed to form into a module, it is preferable that a low-melting solder be used. For instance, Sn—Pb system alloy may be used as a low-melting solder. As regards membranes, because they are soldered, those having heat resistance are preferable, and those not having metallic layers formed on their entire length may also be employed provided that they have metallic layers formed at least on the portions which are soldered.

As described previously, this invention is capable of improving the electrical conductivity of the resin membrane since metal in a sufficient amount can be reliably formed on the resin membrane. This invention provides a resin membrane having a resistivity ranging from 1 to 20 $\Omega/cm$ and extremely favorable electrical conductivity. The provision of sufficient electrical conductivity can completely remove static electricity generated when the membrane filters non-aqueous solutions. To remove static electricity, conventionally, metal gauze has been wound around the resin membrane to form a ground. This invention, however, can eliminate such an arrangement since the resin membrane itself is provided with sufficient electrical conductivity.

A resin membrane with sufficient electrical conductivity can be positively or negatively charged as required. This fact indicates that the life of the resin membrane can be increased, and precision filtration is made possible by controlling the charge of the membrane in accordance with the charge of suspended matter in solution. More specifically, when the resin membrane is charged with the same charge as that of the suspended matter, the suspended matter is prevented from adhering to the membrane. As a result, it is possible to decrease the frequency of the backwashing of the resin membrane and to remarkably increase the life of the resin membrane. When the resin membrane is charged reversely with respect to the suspended matter, even suspended matter which is present in the resin membrane and smaller than the pores can be trapped. Thus, precision filtration is made possible while the diameters of the pores remain unchanged.

A membrane with such electrical conductivity is effective for the measures taken for electro magnetic compatibility (EMC), which measures are simply taken by inserting a signal line into the membrane coated with the metallic layer in a sufficient amount.

After conducting extremely thorough examinations, the inventor of this invention has found the following fact, that the electrical conductivity can be controlled by either increasing or decreasing the amount of a reducing agent to be used in the electroless treatment, particularly the amount of phosphorus which is present in the metallic layer. The electrical conductivity decreases as the amount of phosphorus increases, and conversely, it increases as the amount of phosphorus decreases.

A metallic layer having enhanced bond strength and sufficient thickness can be formed on the resin membrane, thereby improving the heat resistance of the resin membrane. Even using a resin membrane, especially an olefin-system resin membrane, having a low heat resistance temperature, a metallic layer, such as that described in this invention, can be formed and increase greatly this temperature. For instance, if the heat resistance temperature of an untreated membrane having no metallic layer formed is approximately 70° C., it can be increased by 50° C. by forming a metallic layer. The resin membrane can thus be subjected to heat treatment, like heat sterilization.

Although a description has been given of a type of porous resin to which metals are chemically bonded, any type of resin may also be employed as long as it produces functional groups capable of being chemically bonded to metals.

Therefore, this invention may be understood as a method for producing a metallic layer which can be strongly bonded to resin.

BRIEF DESCRIPTION OF THE DRAWINGS

FIG. 22 (1) is a plan view of the module; FIG. 22 (2) is a side view of the module; and FIG. 22 (3) is a perspective view of the module.

DESCRIPTION OF THE PREFERRED EMBODIMENTS

The examples and embodiment of the present invention will be described below.

EXAMPLE 1

(First formation of a metallic nickel layer on hollow fiber membrane (hereinafter referred to simply as membrane))

A polypropylene-made porous membrane, manufactured by Akzo Coatings Ltd., having an inside diameter of 600 μ and a porosity of 6%, was dipped for several minutes into a solution (the temperature of which ranged from 50° to 65° C.) mixed with 30–50% chromic acid ($CrO_3$) and 10–40% sulfuric acid, and thereby etched. The membrane was then taken out of the mixed solution and thoroughly rinsed. Then, this membrane was first dipped into a solution (having hydrochloric acid concentration of several %) formed by adding hydrochloric acid into a weak acid solution and then dipped into a weak alkali solution of ammonia/caustic soda so as to neutralize it. Thereafter, the membrane was dipped for 2 to several minutes into a solution (the temperature of which ranged from 30° to 50° C.) containing 0.2–5% palladium chloride ($PdCl_2$), 20% hydrochloric acid, and 15–40% stannic chloride (SnCl), whereby palladium was chemically bonded to the membrane. After the membrane had been rinsed, it was dipped for 1 to 2 minutes into a weak hydrochloric acid solution (having a temperature of 40° C. and hydrochloric acid concentration of several %), and rinsed again. Then, the membrane was dipped for 1–15 minutes into a weak alkali nickel ion solution, and plated electrolessly, the pH of this solution being adjusted to 9.0–10.0 with $NiSO_4$ (1–7% Ni), 0.1–0.3 mol of citric acid soda, 0.2–0.5 mol of hypophosphorous soda, and ammonia water. When the membrane was taken out of the above solution and rinsed, a membrane on which a metallic nickel layer was formed was obtained.

Figure 1:
FIG. 1 is a scanning electron microscope (SEM) photograph showing the sectional structure of a metallized membrane.
Figure 2:
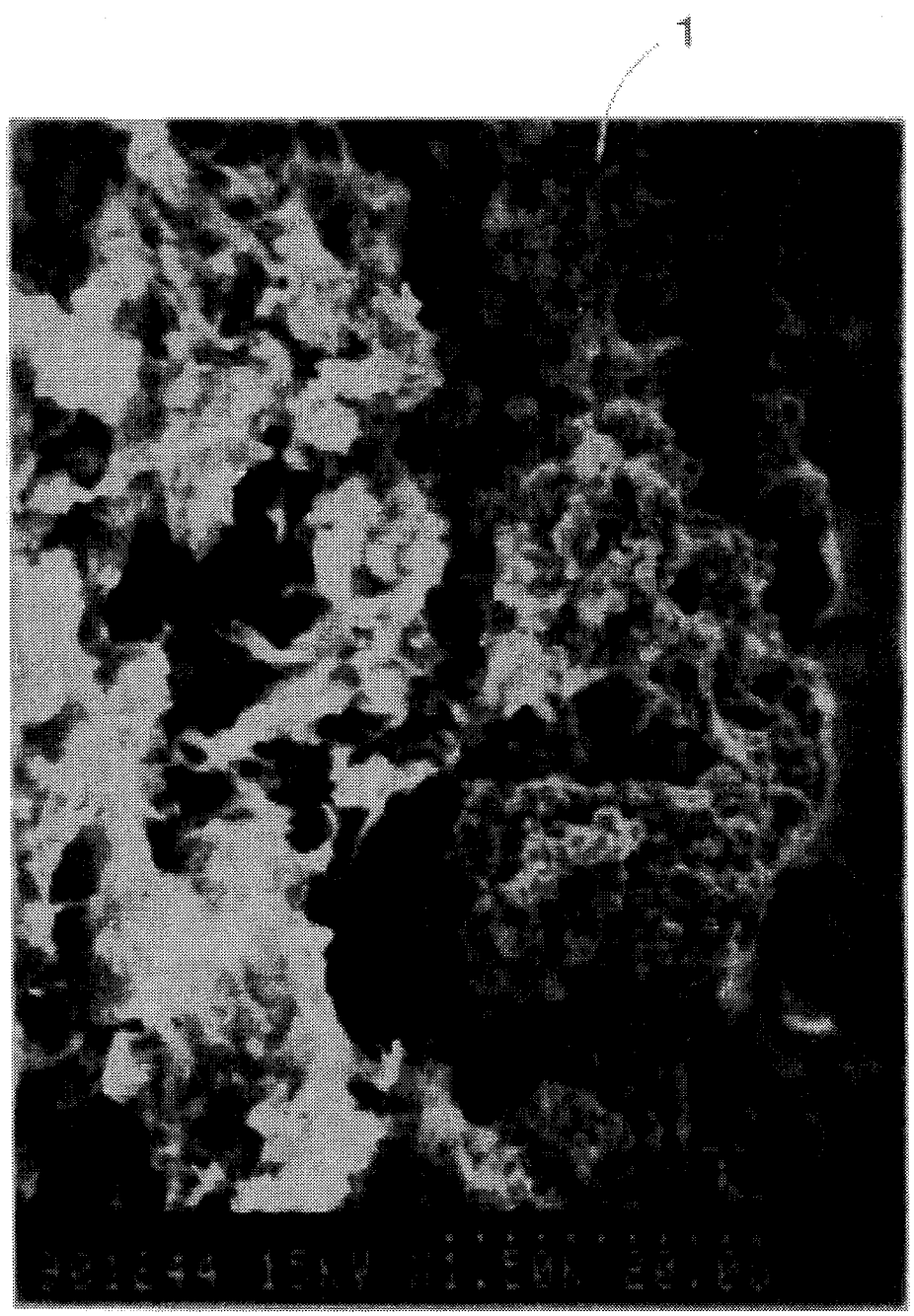
FIG. 2 is an enlarged photograph of FIG. 1.

The thus-obtained membrane was cut diametrically, and the section thereof was examined under a scanning electron microscope (SEM). A SEM image (×220) as shown in FIG. 1 was obtained. FIG. 2 is an enlarged image (×1500) of FIG. 1. The outmost surface of the membrane is shown on the right-hand sides of FIGS. 1 and 2. As apparently shown in FIG. 1, the metallic nickel layer 1 was formed continuously, uniformly and thickly from the outer surface to the inside of a porous resin material, of which the membrane is formed.

Figure 3:
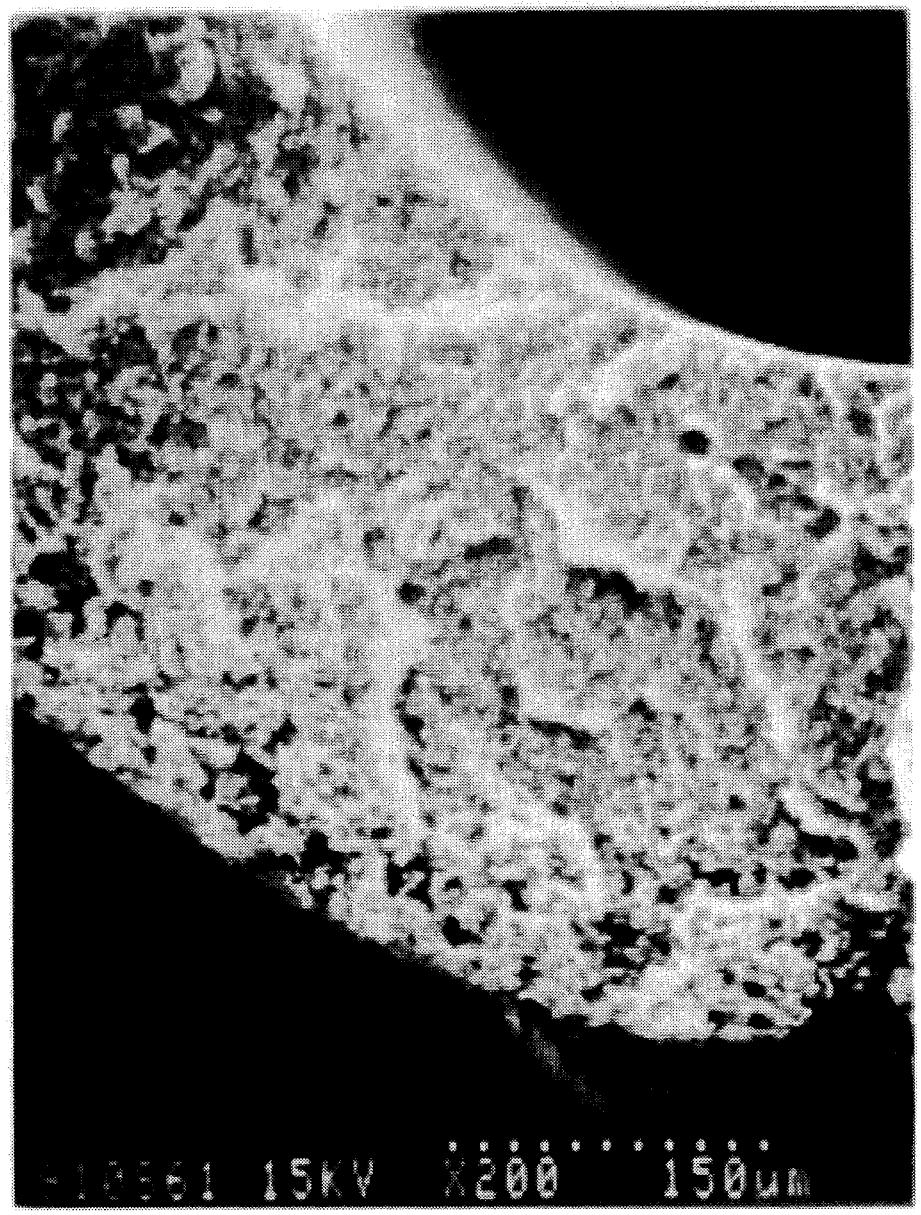
FIG. 3 is a SEM photograph, which corresponds to FIG. 1, showing a membrane on which a metallic layer is not formed.

The above becomes obvious when FIGS. 1 and 2 are compared with FIG. 3, which is a SEM image (×200), showing an untreated membrane which is neither etched nor metallized. The outmost surface of the untreated membrane is shown in the lower part of FIG. 3.

Figure 4:
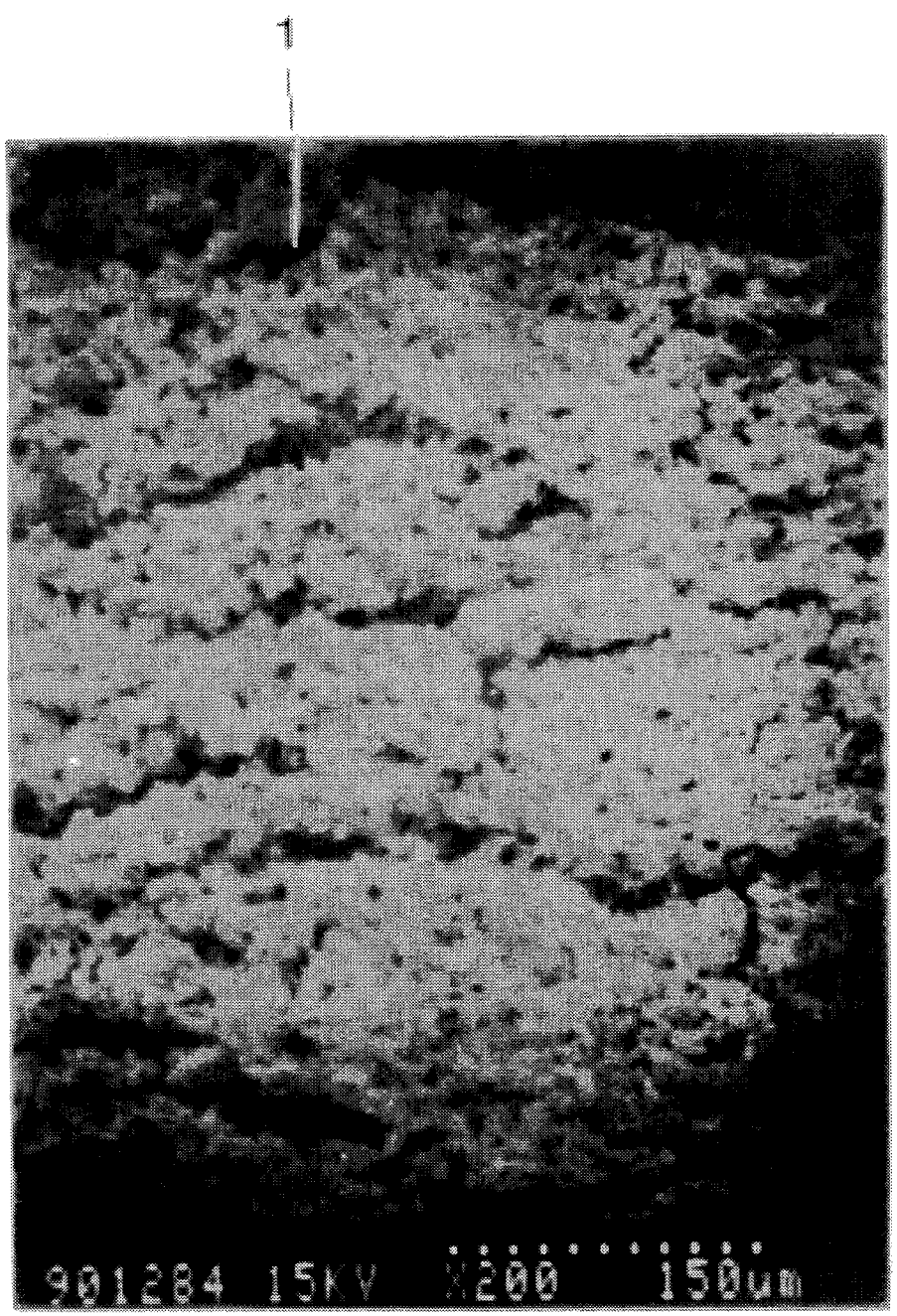
FIG. 4 is a SEM photograph showing the structure of the outer surface of the membrane on which a metallic layer is formed.
Figure 5:
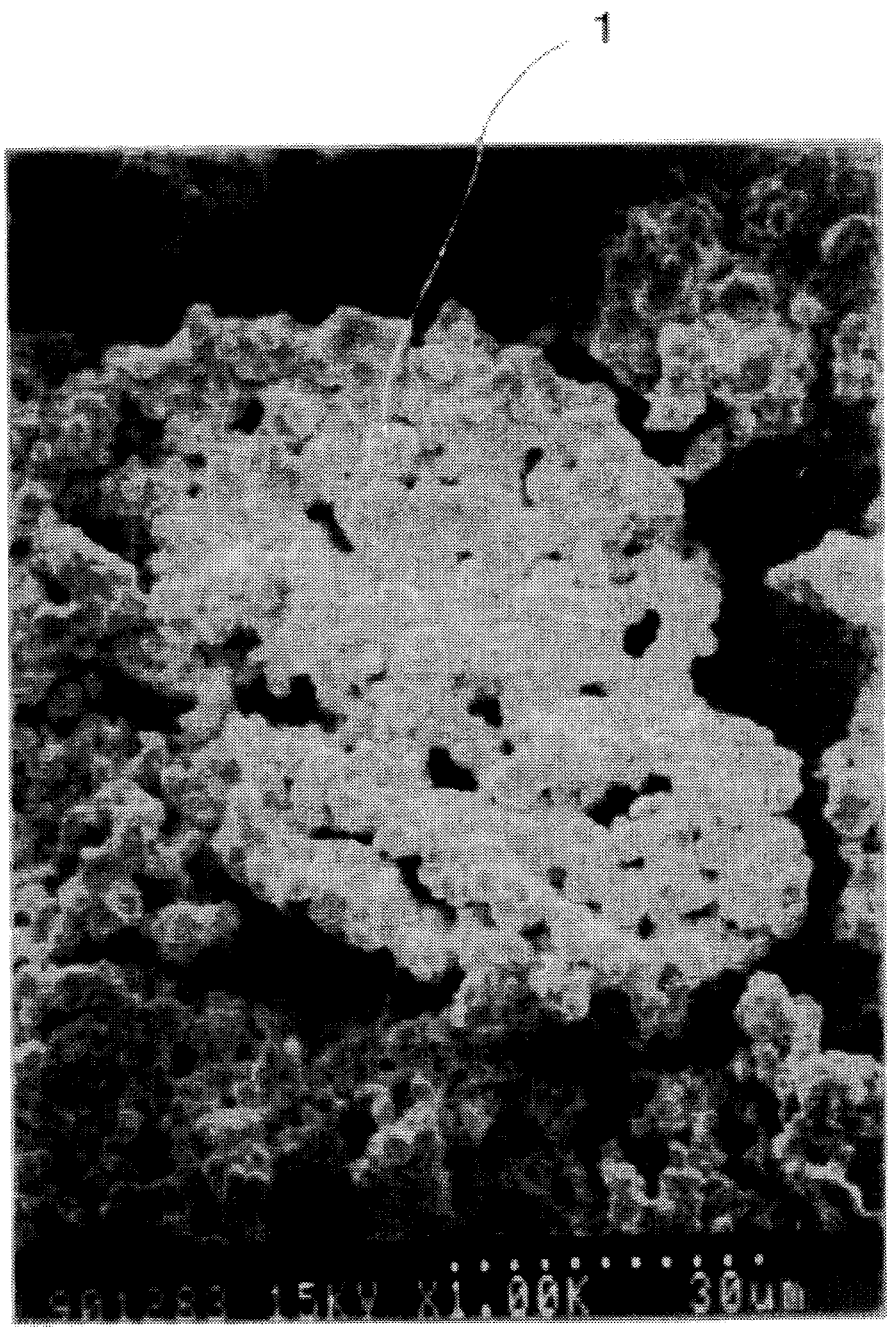
FIG. 5 is an enlarged photograph of FIG. 4.
Figure 6:
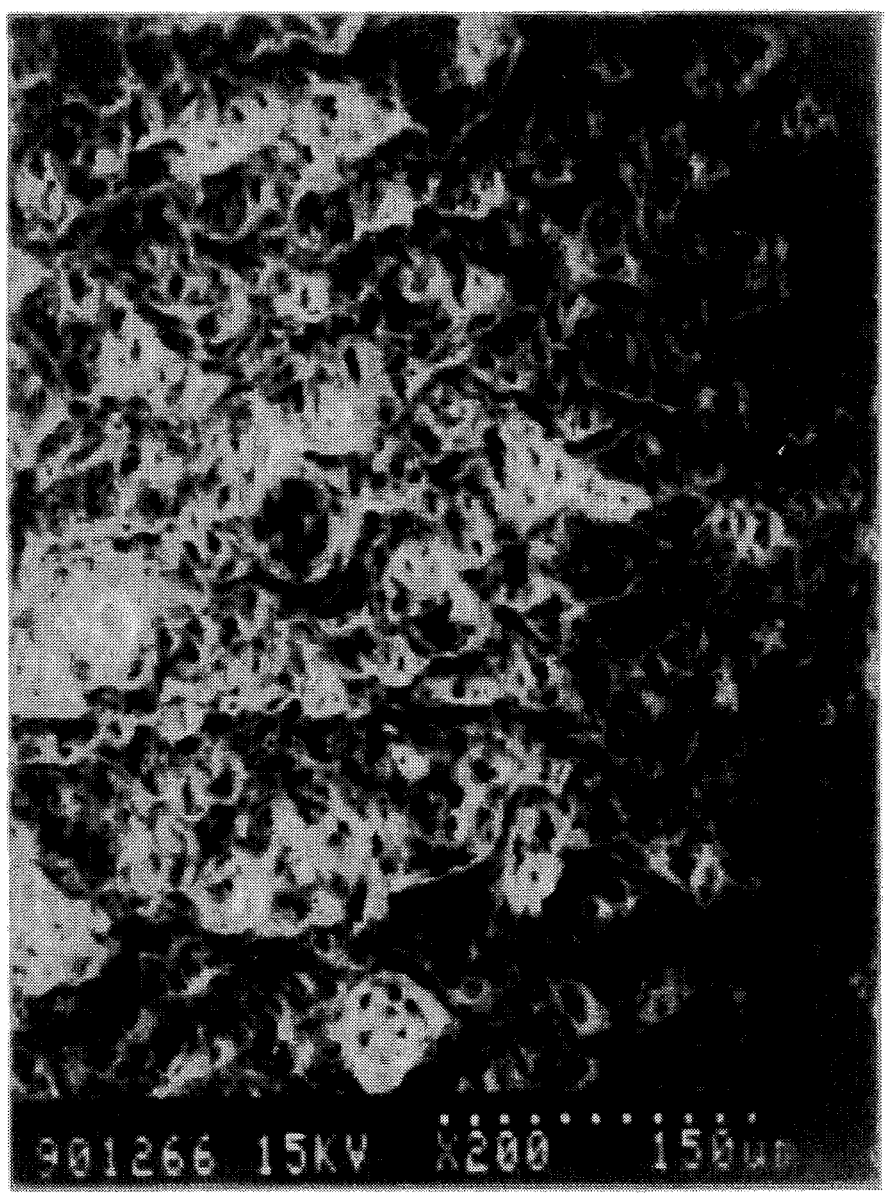
FIG. 6 is a SEM photograph showing the structure of the outer surface of the membrane on which a metallic layer is not formed.
Figure 7:
FIG. 7 is an enlarged photograph of FIG. 6.

FIG. 4 is a SEM image (×200) showing the outer peripheral structure of the porous membrane according to this example. FIG. 5 is an enlarged SEM image (×1000). It is obvious that the metallic nickel layer is formed on the outer surface of the membrane of this example when FIGS. 4 and 5 are compared with FIG. 3 showing the SEM image of the untreated membrane mentioned above. FIGS. 6 and 7 are SEM images, corresponding to FIGS. 4 and 5, which show untreated membranes. When these drawings are compared, it is apparent that a metallic nickel layer is uniformly formed starting from the surface to the inside of a porous resin material, of which the membrane of this invention is formed.

EXAMPLE 2

(Second formation of metallic nickel layer on membrane)

A polyarylate-made, porous membrane having an inside diameter of 0.8 mm and a porosity of 70% was dipped for several minutes into a solution (the temperature of which ranged from 30° to 60° C.) of 10–20% hydrochloric acid, and rinsed. Then it was dipped for 5 minutes into a solution (having a temperature of 60° C.) of caustic soda, and thereby etched. After the membrane had been rinsed, it was first dipped for several minutes into a solution (the temperature of which ranged from 10° to 90° C.) of 10–20% hydrochloric acid, and then dipped for several minutes into a solution (having room temperature) formed by adding several % hydrochloric acid and weak acid, whereby the membrane was neutralized. The membrane was then dipped for two to several minutes into a solution (the temperature of which ranged from 30° to 50° C.) containing several % palladium chloride ($PdCl_2$), 20% hydrochloric acid, and 15–40% stannic chloride (SnCl), whereby palladium was chemically bonded to the membrane. After the membrane had been rinsed, it was dipped for several minutes into a solution (the temperature of which ranged from 10° to 90° C.) of 10–40% sulfuric acid and rinsed again. Then it was dipped for several minutes into a solution (the temperature of which ranged from 10° to 90° C.) of 10–20% caustic soda to neutralize it, and rinsed. Next, the membrane was dipped for 1 to 15 minutes into a weak alkali nickel ion solution, the pH of which was adjusted to 9.0 to 10.0 with $NiSO_4$ (1–7% Ni), 0.2 mol of citric acid soda, 0.3 mol of hypophosphorous soda, and ammonia water. When the membrane was taken out of this solution and rinsed, a membrane on which a metallic nickel layer was formed on polyarylate was obtained.

COMPARISON EXAMPLE 1

When the membrane was processed in the same manner as in Examples 1 and 2, except that etching was not carried out, a metallic nickel layer was not formed on the membrane

EXAMPLE 3

(Formation of metallic copper layer on membrane and electrical conductivity test for metallic layer)

In the same way as in Examples 1 and 2, except that $CuSO_4$ (1–7% Cu) was used instead of $NiSO_4$, a plurality of membranes on which metallic copper layers were formed were obtained. When the thicknesses of the metallic copper layers on the membranes were measured, it was found that, on the average, they were 20 to 30% of the thicknesses of the membranes. The amount of the metal coat was $6\times10^{-3}$ mol/m on the average. When the resistivity of these membranes was measured, it was found to be, on the average, 3 $\Omega$/cm. Then, the membranes were dipped for 5 to 10 minutes into a nickel Watts bath (having a temperature of 40 C.), and electrically charged in the condition of 1–3 A/dm and electrolyzed, whereby a metallic nickel layer was formed. When the resistivity of such membranes was measured, it was found to be, on the average, 1 $\Omega$cm.

Also, in the same manner as in Example 3, the resistivity, the thickness of the metallic layer, and the amount of the metal coat of the membrane obtained in Example 1 were measured. The results were the same as those in Example 3.

EXAMPLE 4

(Peeling resistance test for metallic layer)

The peeling resistance of electroless metallic nickel layers formed on the surfaces of the membranes which had the metallic copper layers and were obtained in Example 1 was confirmed by a tape peeling test. The test was carried out using Cellophane Self-adhesive Tape CT-18 (trade name) manufactured by Nichiban Co., Ltd. Tape was glued to the membranes and quickly peeled off, and if metal adhered to the tapes, the membranes were regarded as not resistant to peeling. As a result, it was confirmed that the nickel layer was not peeled from any membranes.

In the same manner as described above, when a peeling resistance test was conducted for the membrane with the electroless metallic layer obtained in Example 3, it was observed that no metallic layer was peeled.

EXAMPLE 5

(Heat resistance test)

A heat resistance test was performed for the polypropylene-made, porous membrane obtained in Examples 1 and 3. Membranes coated with nickel and copper by an electroless treatment were used as materials for this invention. A polypropylene-made untreated membrane on which no metal was coated was used as a material with which the above materials were compared. The heat resistance test was carried out in the following way. One end of each membrane was attached to a metallic rod-like member, and a weight of 0.4 g was attached to the other end of the membrane. A well-known lubricating oil (engine oil 10W-30) was poured into a test cup. The rod-like member was supported so that the substantially entire length of the membrane was dipped into the lubricating oil. Then, the lubricating oil was heated over a hot plate at a speed of 2°–3° C./minute.

The untreated membrane broke at 75° C.; the copper-coated membrane at 90° C.; and the nickel-coated membrane at 120° C. This indicates that the heat resistance of the membrane can be improved because the metallic layer of high bond strength is thickly formed on the membrane.

EXAMPLE 6

(Solderability test)

A solderability test was carried out for a type of untreated membrane, a type of membrane having the metallic nickel layer produced in Example 1 and for a type of membrane having the metallic copper layer produced in Example 3. All types of membranes were made of polypropylene. In this example, several untreated membranes and several membranes of Examples 1 and 3 were bundled. The bundles were dipped into three low-melting solder melts (low-temperature bar solder manufactured by Senju Metal Industry), each having a melting point of 72° C., 68° C. and 58° C. The solderability of the three types of membranes were observed and compared. As a result, it was found that solder adhered satisfactorily to both types of membranes on which the metallic layers were formed. On the contrary, no solder adhered to the untreated membrane, on which no metallic layer was formed. Even when it was intended to peel the respective membranes to which solder adhered, the membranes themselves were peeled first, and the soldered portion remained intact. This indicates that the membranes are tightly and chemically bonded to the metallic layers.

Figure 8:
FIG. 8 is a SEM photograph showing the diametrically sectioned structure of a nickel-coated membrane to which solder adheres.
Figure 9:
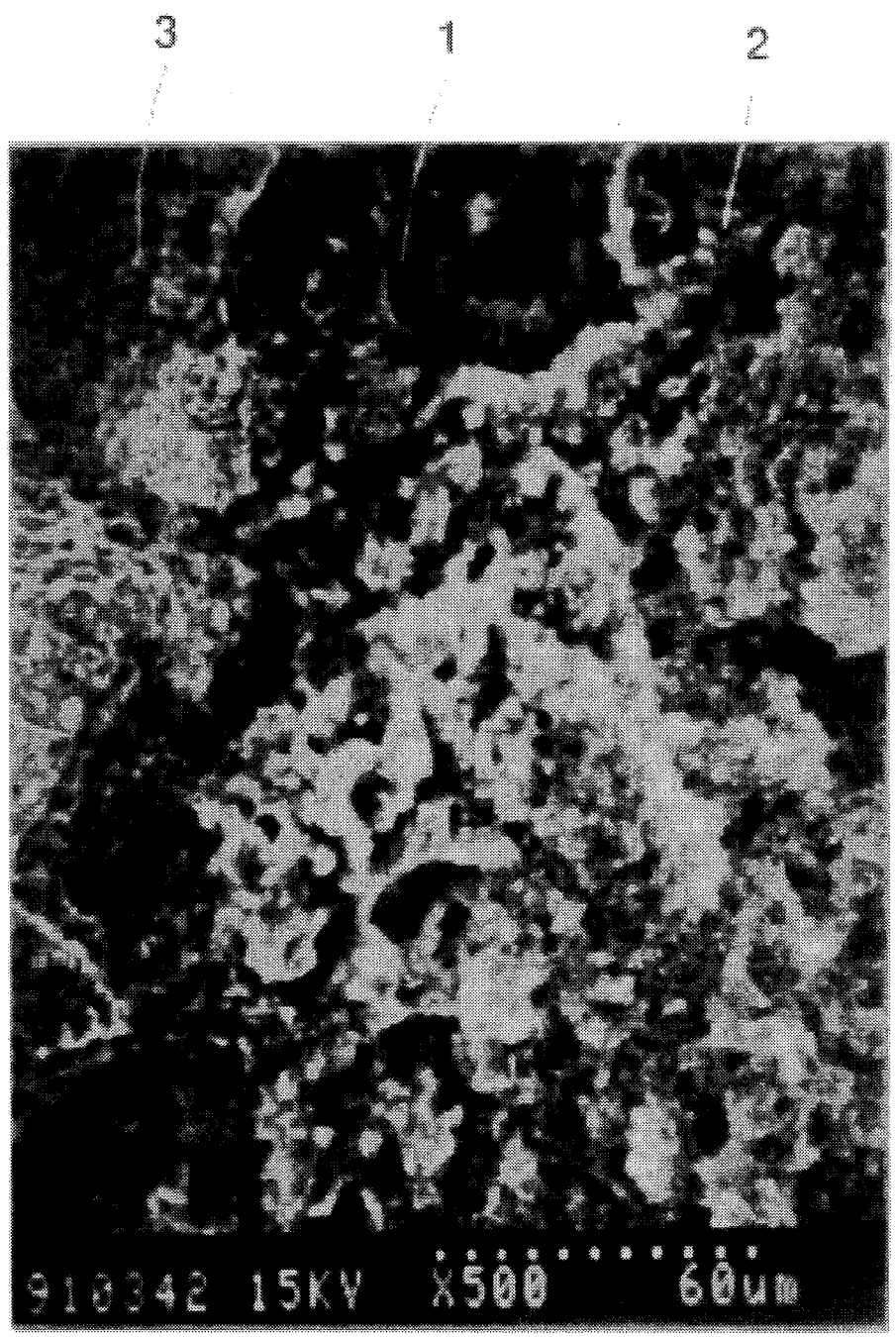
FIG. 9 is a SEM photograph showing the outer peripheral structure of the membrane shown in FIG. 8.
Figure 10:
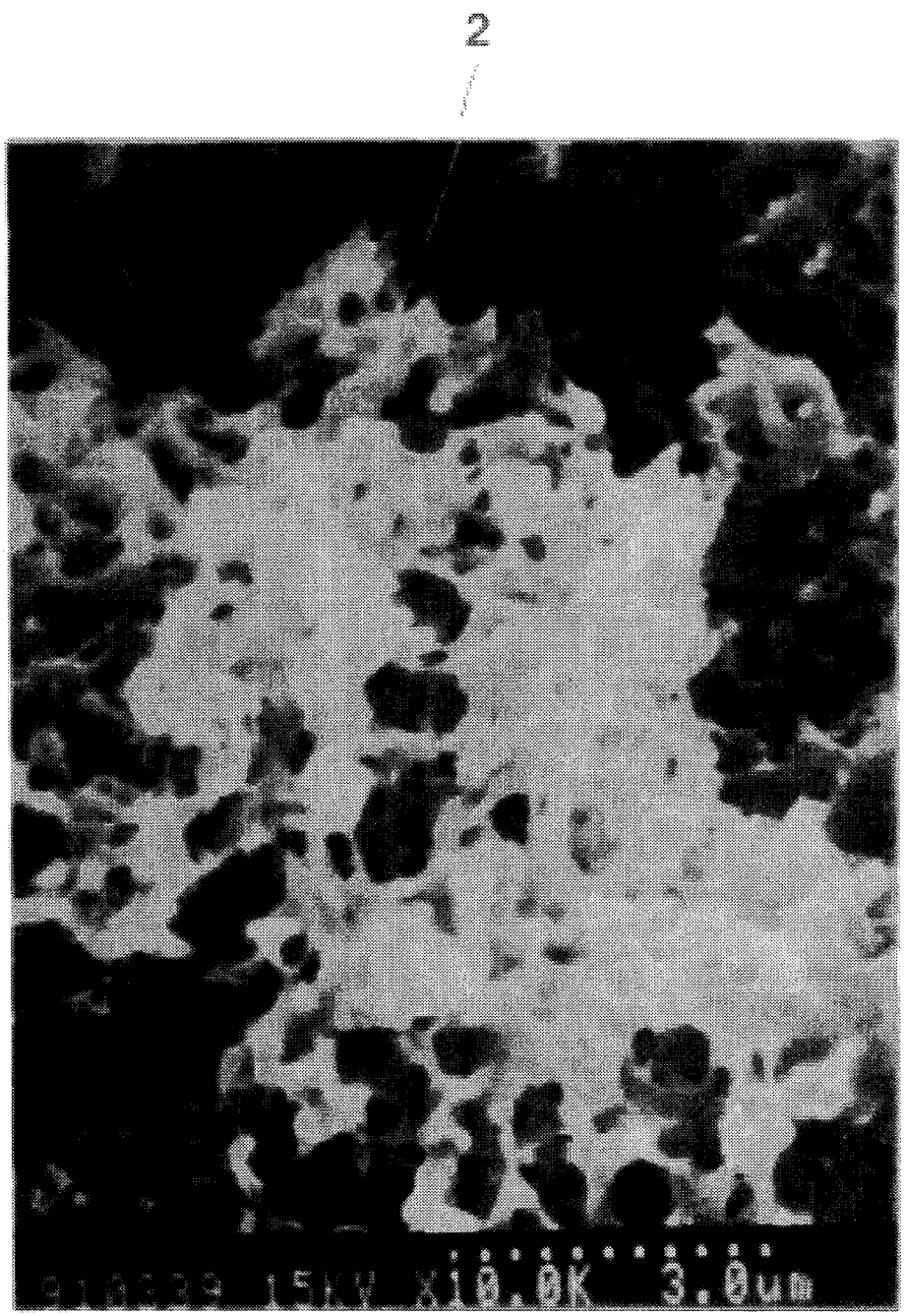
FIG. 10 is a SEM photograph showing the central structure of the membrane shown in FIG. 8.
Figure 11:
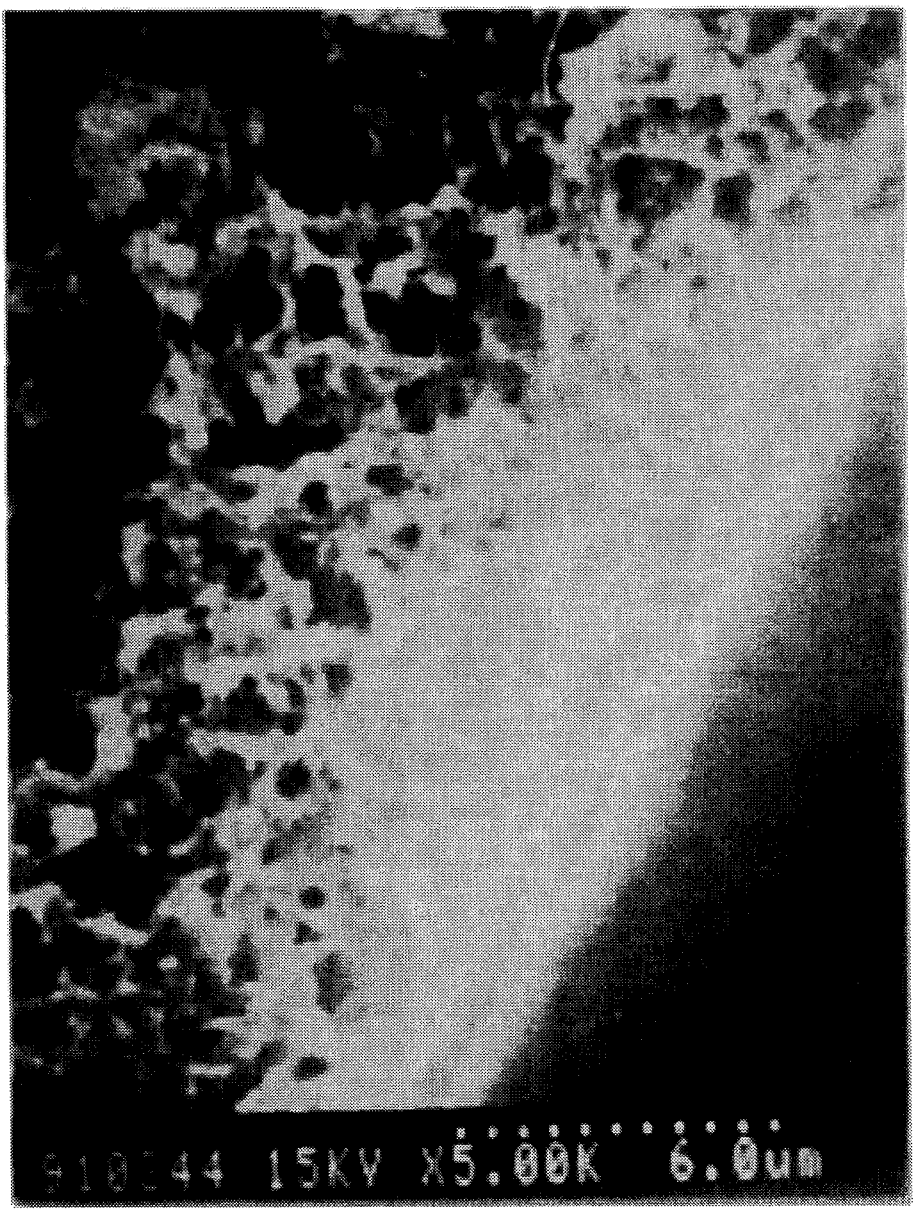
FIG. 11 is a SEM photograph showing the inner peripheral structure of the membrane shown in FIG. 8.
Figure 12:
FIG. 12 is a SEM photograph showing the structure of the outer peripheral surface of the nickel-coated membrane to which solder adheres.
Figure 13:
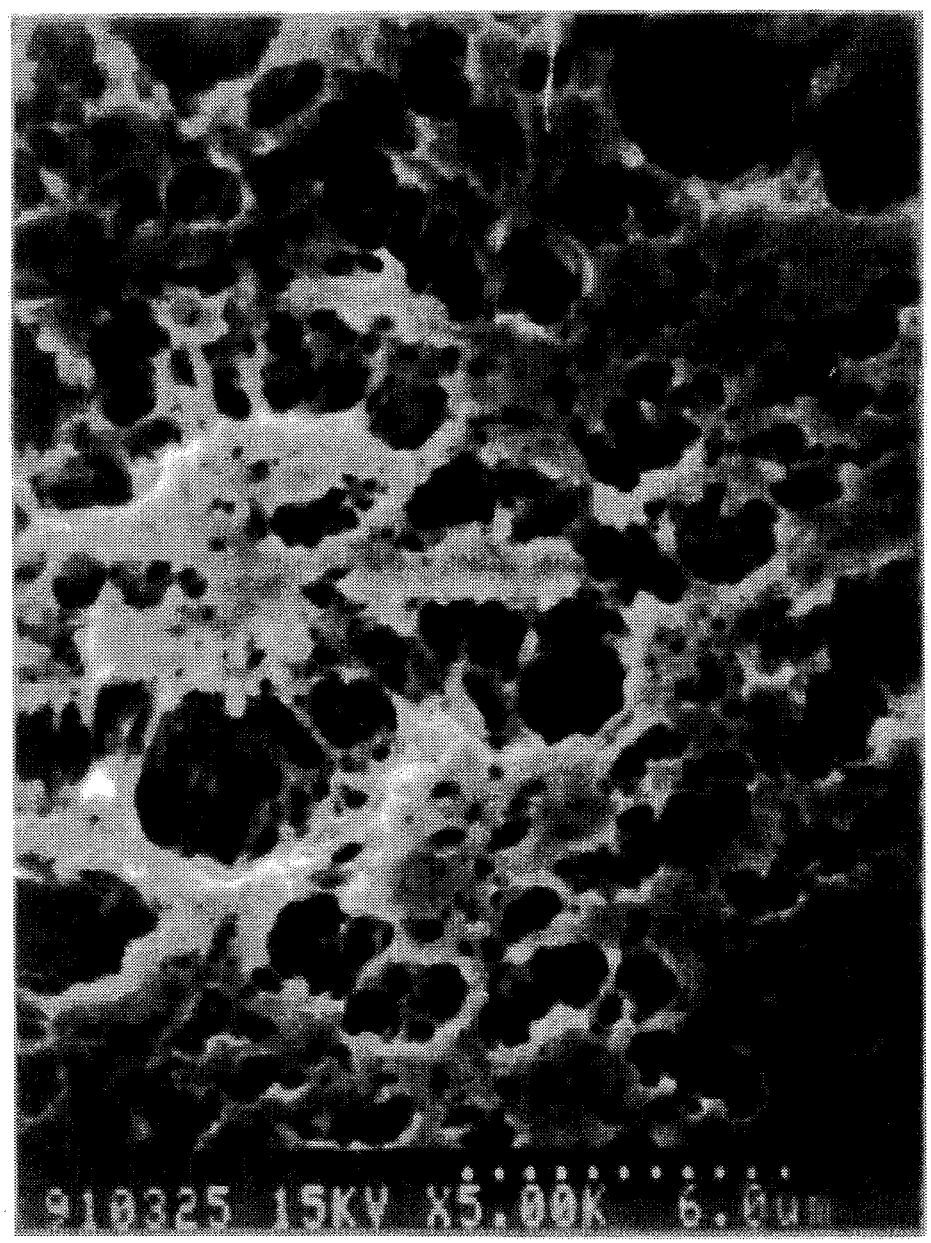
FIG. 13 is a SEM photograph showing the structure of the inner peripheral surface of the membrane shown in FIG. 12.

FIG. 8 is a SEM image (×200) showing the diametrically sectioned structure of the nickel-coated membrane to which solder adheres; FIG. 9 is an enlarged SEM image (×500) of FIG. 8 which illustrates the outer peripheral structure of the membrane; FIG. 10 is an enlarged SEM image (×10000) showing the structure of the diametric center of the membrane; and FIG. 11 is an enlarged SEM image (×5000) showing the inner peripheral structure of the membrane. As clearly shown in FIGS. 8 and 9, it is confirmed that the porous resin material 2, of which the membrane is formed, the nickel layer 1 formed on the resin material 2, and the solder layer 3 adhering to the nickel layer 1 are present in that order from the inner periphery of the membrane. FIG. 12 is a SEM image (×2000) showing the structure of the outer peripheral surface of the membrane with the metallic nickel layer according to Example 1. FIG. 13 is a SEM image (×5000) showing the structure of the inner peripheral surface of the same membrane. When these images are examined in detail, it is confirmed that solder adheres uniformly and closely to the outer surface of the metallized membrane. The nickel layer is not coated at the diametrical center or the inner periphery of the membrane. Solder does not adhere to the porous resin material forming the membrane. However, since the outer peripheral surface of the membrane is coated with the nickel layer, solder adheres to the nickel layer, thus making it possible to form the membrane into a module.

Figure 14:
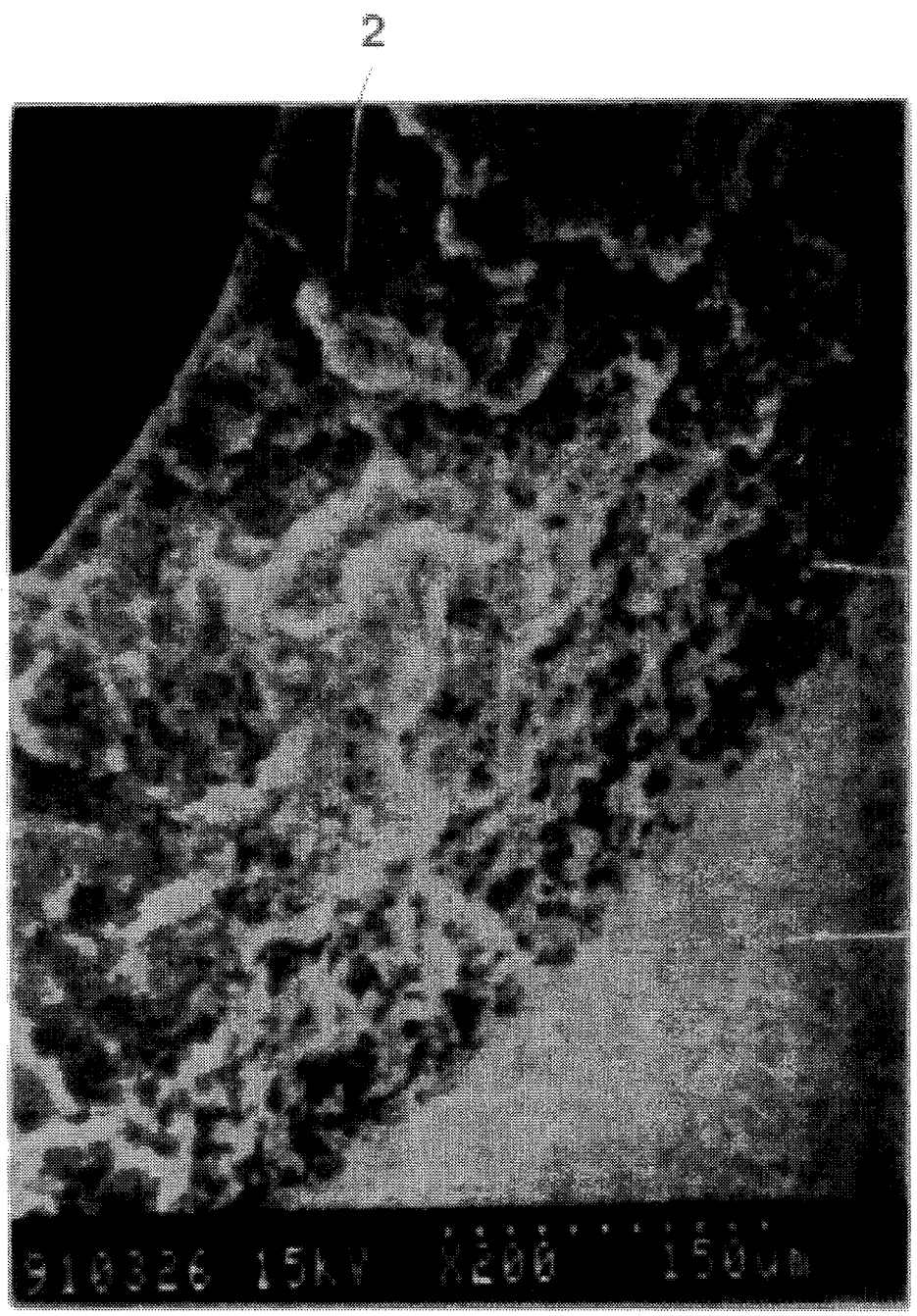
FIG. 14 is a SEM photograph showing the structure of the diametrical section of a copper-coated membrane to which solder adheres.
Figure 15:
FIG. 15 is a SEM photograph showing the outer peripheral structure of the membrane shown in FIG. 14.
Figure 16:
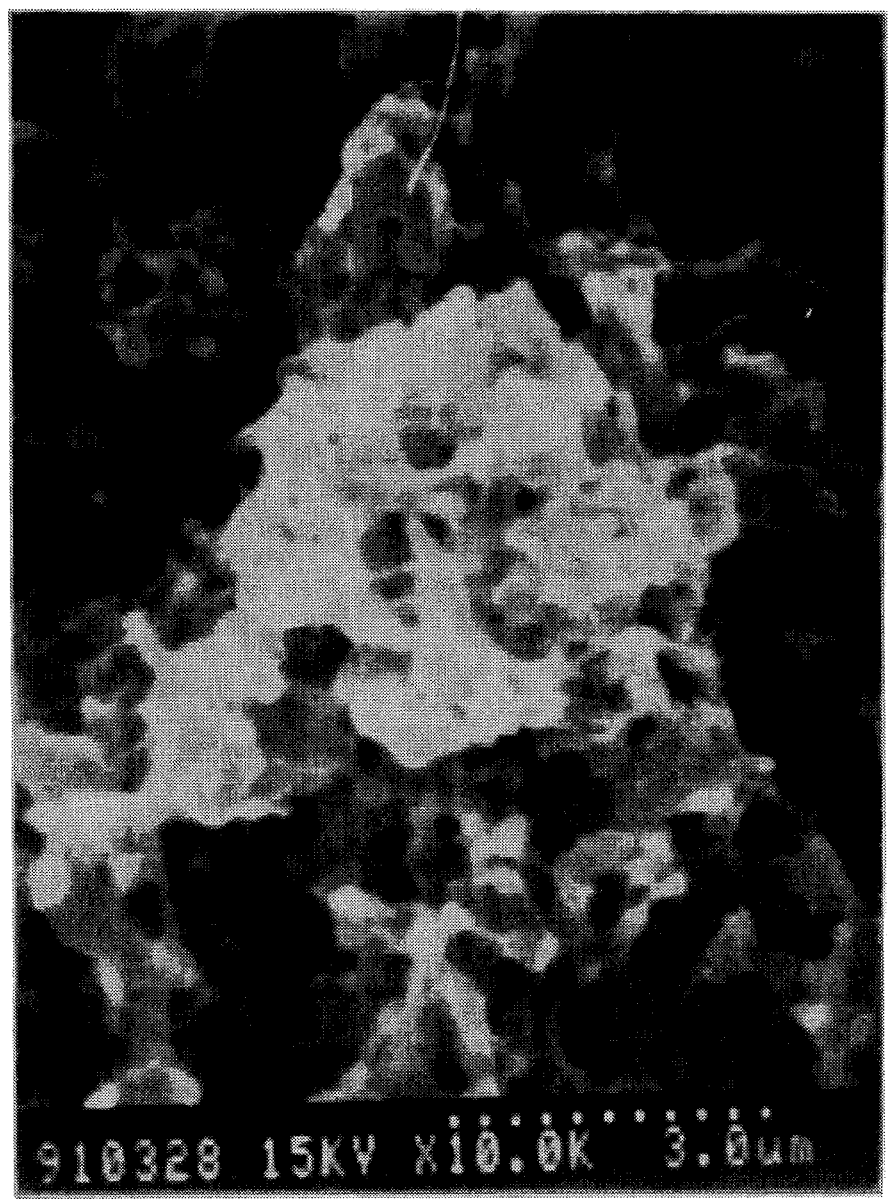
FIG. 16 is a SEM photograph showing the central structure of the membrane shown in FIG. 14.
Figure 17:
FIG. 17 is a SEM photograph showing the inner peripheral structure of the membrane shown in FIG. 14.
Figure 18:
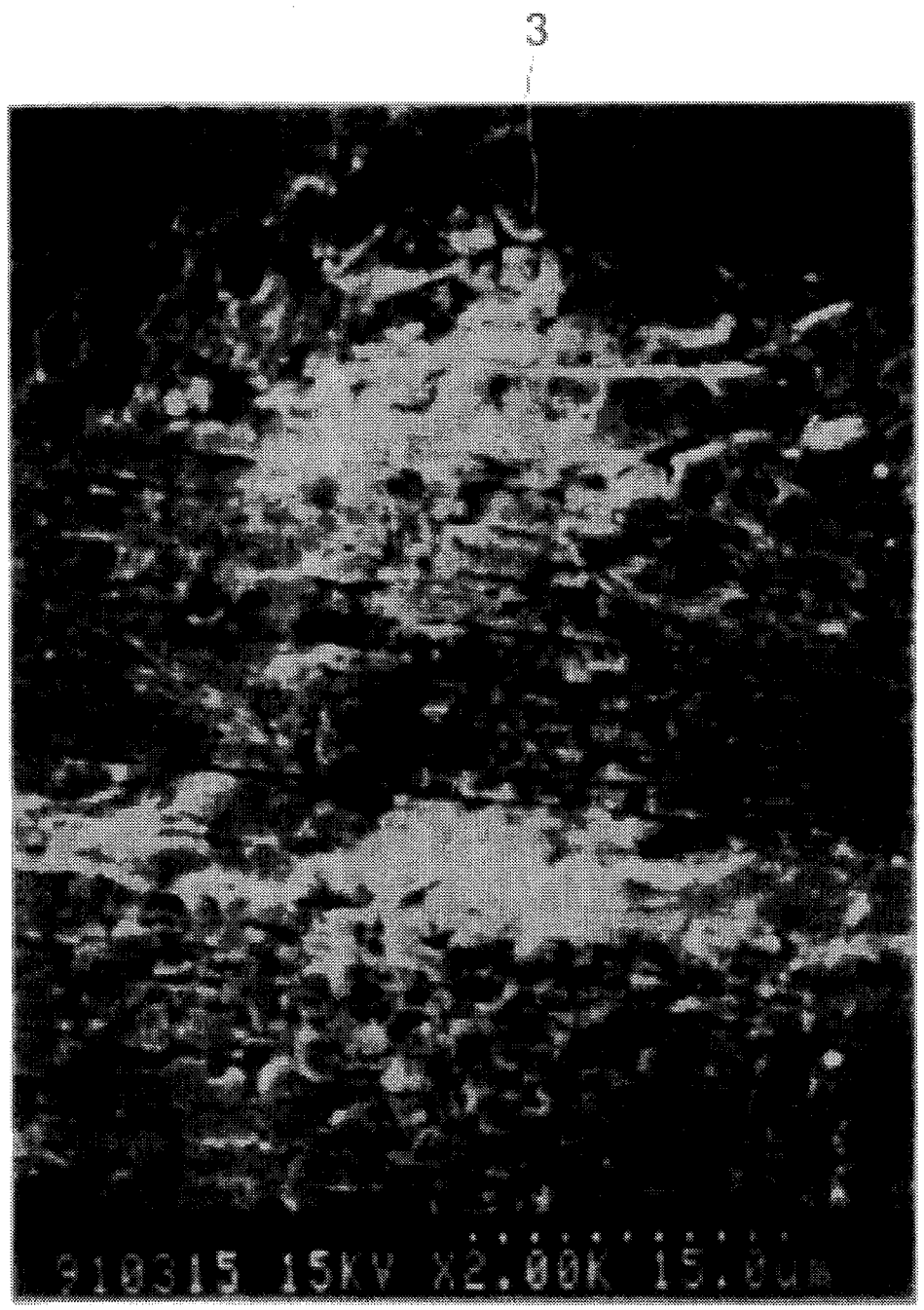
FIG. 18 is a SEM photograph showing the structure of the outer peripheral surface of the copper-coated membrane to which solder adheres.
Figure 19:
FIG. 19 is a SEM photograph showing the structure of the inner peripheral surface of the membrane shown in FIG. 15.

Solder adhered to the metallic copper-coated membrane obtained in Example 3, and the structure thereof was confirmed. FIG. 14 is a SEM image (×200) showing the diametrically sectioned structure of such a membrane; FIG. 15 is an enlarged SEM image (×2000) showing the outer peripheral structure of the membrane; FIG. 16 is a SEM image (×10000) showing the structure of the diametrical center of the membrane; FIG. 17 is an enlarged SEM image (×5000) showing the inner peripheral structure of the membrane; FIG. 18 is a SEM image (×2000) showing the outer peripheral surface of the membrane; and FIG. 19 is a SEM image (×5000) showing the inner peripheral surface of the membrane. When these images are examined, it is confirmed that, in the same manner as regards the membrane with the nickel layer mentioned previously, solder adheres uniformly and closely to the outer peripheral surface of the membrane, on which surface the copper is coated.

COMPARISON EXAMPLE 2

The polypropylene-made, porous membrane was treated in the method disclosed in Japanese Patent Laid-Open No. 56-56106. After the membrane had been dipped into ethanol and rinsed, it was treated in a solution of stannous oxide and hydrochloric acid. The membrane was then rinsed thoroughly again and dipped into a silver-plating solution. As a result, an extremely small amount of silver adhered to the surface of the membrane. When a solderability test was conducted on such a membrane in the same manner as in the above example, it was found that it was impossible for solder to adhere to the membrane.

COMPARISON EXAMPLE 3

Platinum-vanadium was deposited on the surface of the membrane by the conventional ion sputtering method using platinum-vanadium as a target. Soldering was performed in the same way as in the examples mentioned above. However, it was impossible to perform soldering. This appears to be because the amount of the metallic layer was insufficient, and the layer and solder were not alloyed sufficiently for soldering.

EXAMPLE 7

When a porous membrane made of polysulfone and a porous membrane made of polyethersulfone were etched and electrolessly plated in the same manner as in Examples 1 and 2, a uniform and thick-filmy metallic nickel layer was formed on each membrane.

EXAMPLE 8

Figure 20:
FIG. 20 is a SEM photograph showing the sectional structure of a metallized membrane made of polyacrylonitrile.

A polyacrylonitrile-made ultrafilter membrane, (division molecular weight being 1300 and 6000) manufactured by Asahi Chemical Industry Co., Ltd., was treated in the same way as in Example 1, except that etching was not performed. As shown in FIG. 20, a membrane which had a metallic nickel layer chemically bonded to the outside thereof was obtained. (The outside of the membrane is shown at the right-hand side of FIG. 20)

EXAMPLE 9

A membrane was treated in the same manner as in Example 1, except that, instead of performing etching as was done in Example 1, the membrane was dipped for several minutes into a solution (the temperature of which ranged from 25° to 50° C.) mixed with 60–80% nitric acid and 20–40% ammonium hydrogen fluoride. As a result of this treatment, a membrane to which a metallic nickel was bonded was obtained in the same way as in Example 1. When a membrane made of cellulose acetate was treated in the same manner as just described above, the same results were obtained.

EXAMPLE 10

When a plurality of membranes having metallic nickel and copper layers produced in Examples 1 and 3 were dipped for several minutes into a commercially available electroless gold-plating solution (OPC Immersion Gold Solution) manufactured by Okuno Chemical Industries Co., Ltd., a uniform metallic gold layer was formed on each membrane.

EXAMPLE 11

To confirm that metal was capable of being chemically bonded to a function group on the surface of the porous resin, an ion-exchange resin (Amberlite manufactured by Japan Organo Co., Ltd., ion-exchange group (IR 120B): —$SO_3Na$) having a cation-exchange group on the surface of the resin was subjected by the inventor of this invention to the treatments which were performed after the etching step in Example 1. As a result, a uniform metallic nickel layer was formed on the entire ion-exchange group.

Figure 21:
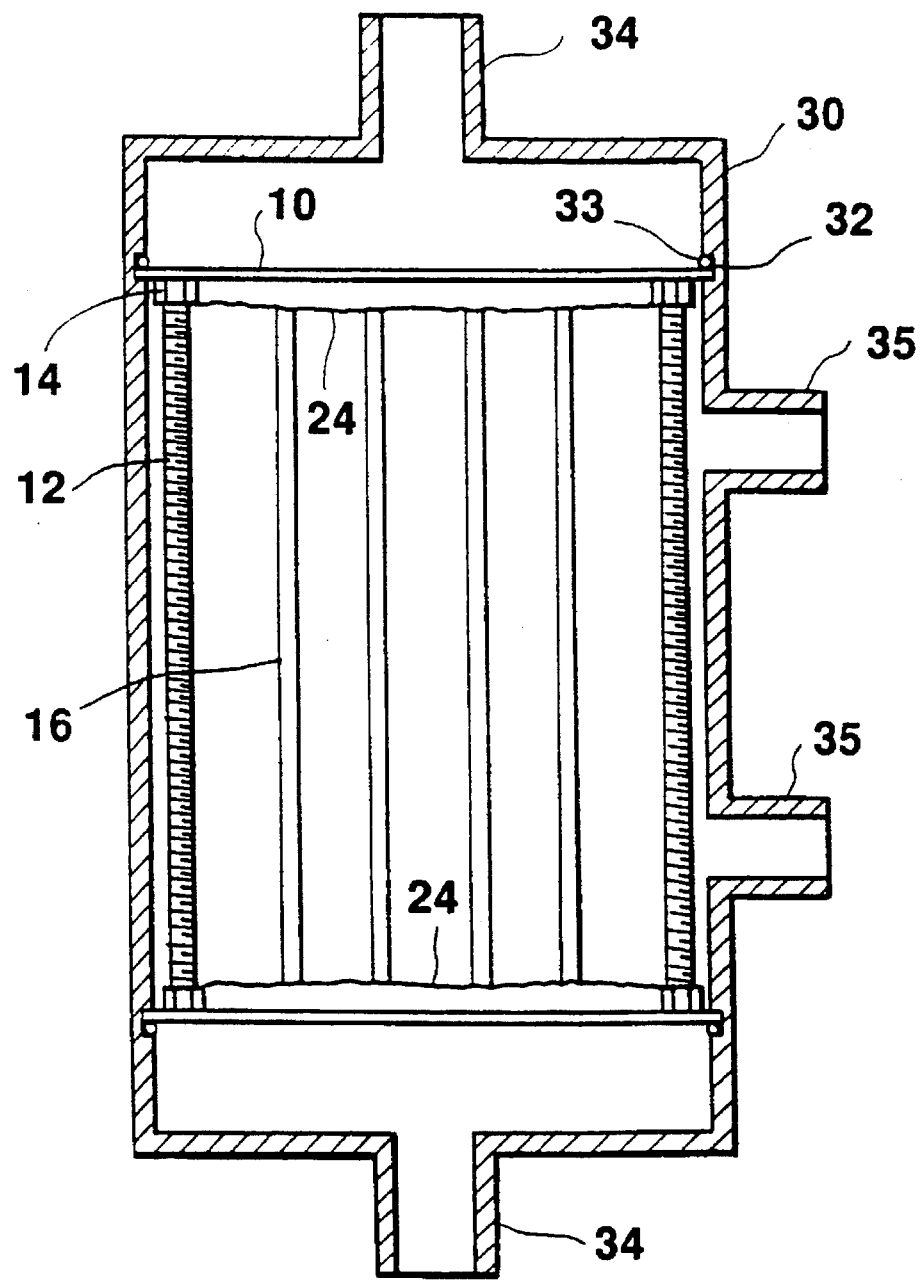
FIG. 21 is a sectional view of a membrane module according to this invention.
Figure 22:
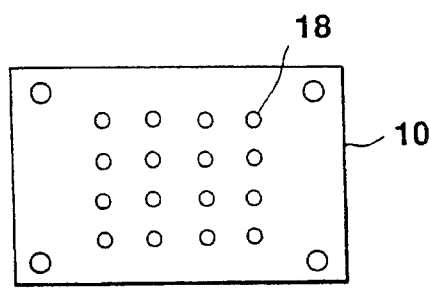
FIG. 22 shows a module where the metallized membranes are secured to plates.
Figure 22:
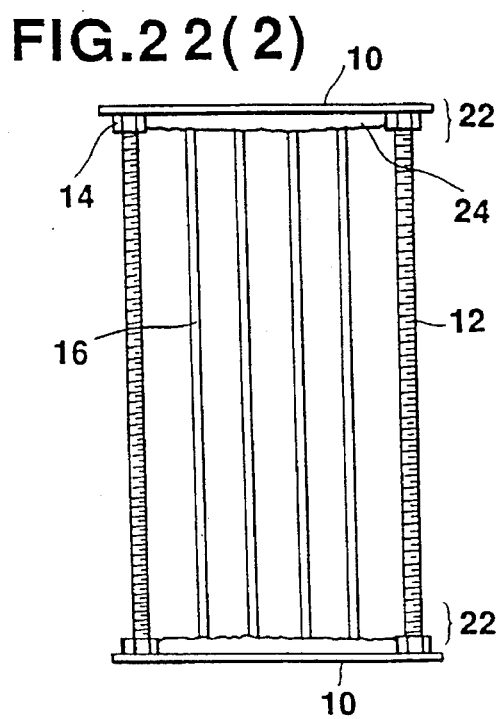
Figure 22:
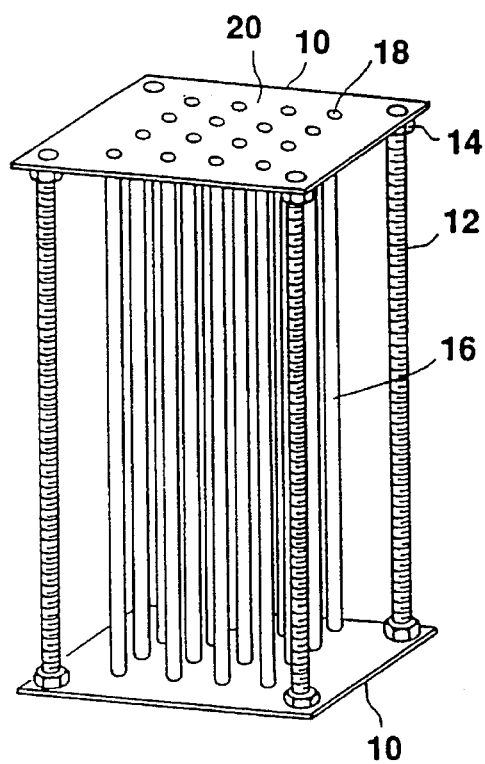

With reference to FIGS. 21 and 22, a description will now be given of an embodiment where the membranes are made into a module.

FIG. 22 shows the module where the metallized membranes are secured to retaining plates; FIG. 22 (1) is a plan view of the module; FIG. 22 (2) is a side view of the module; and FIG. 22 (3) is a perspective view of the module. A plurality of small holes 18 into which the membranes 16 can fit are formed in a pair of retaining plates 10 to which solder adheres very satisfactorily. The upper and lower retaining plates 10 are arranged to face each other. These plates 10 are arranged with the aid of threaded shafts 12 with an appropriate distance therebetween. The threaded shafts 12 are secured by nuts 14 to the retaining plates 10. The small holes 18 are bored in the facing upper and lower plates 10 so that the membranes 16 can run through these holes vertically.

The membranes 16 are coated with metal according to the methods described in the above examples, and then inserted into the small holes 18 in the upper and lower retaining plates 10. If the membranes 16 are fitted into the holes 18 while core bars are being inserted into the membranes 16, it is very convenient because the membranes can be stretched in a straight-line manner. After the membranes 16 have been fitted into the holes 18, the core bars are removed, and the membranes 16 are cut from the outer surfaces of the retaining plates 10.

Next, an adhesive tape is glued to the entire surface of each of the retaining plates 10. Then, when upper and lower portions 22 which fix the membranes 16 to the plates 10 are dipped into melting solder having a low melting point and then taken out of the solder immediately thereafter, solder layers 24 are formed on the respective inner surfaces of the retaining plates 10, thereby fixing all the membranes 16 to the plates 10.

Thereafter, the adhesive tape adhering on the outer surface of each retaining plate 10 is peeled off. Even when the membranes are dipped into the melting solder, there is no risk that the solder will penetrate the membranes and thus block them because of the tape adhered on the outer surfaces of the plates 10.

This embodiment makes it possible to shorten the time required for fixing the membranes by soldering so that such a time is only a matter of seconds, and thus to shorten the time required for making the membranes into a module to an amount much less than the time required for doing the same in the conventional method in which membranes are made into a module by a resin material. Also, since the step of adjusting an adhesive material is not necessary, it is possible to decrease the number of steps for making the membranes into a module. The wettability of solder improves with respect to the metallic coating layers on the membranes. Because of such wettability, even when many membranes are arranged with small spaces therebetween, the solder goes between the membranes which are completely and reliably fixed.

When the membranes are fixed by an adhesive material as in the conventional art, the organic solvent of the adhesive material permeates into the resin forming the membranes, thus deteriorating the resin, e.g. swelling the resin. As a result, the membranes break at the portions thereof fixed by the adhesive material. Fixing by soldering as, for example, in this embodiment, eliminates such a problem, and the durability of the membrane module can be improved.

FIG. 21 shows the module equipped with the membranes secured to the retaining plates 10 mentioned with reference to FIG. 22. The retaining plates 10 are secured through O-rings 33 in recesses 32 formed at the ends of a housing 30. Numerals 34 and 34 denote stock solution ports, and numerals 35 and 35 denote treated solution ports.

In the embodiment shown in FIG. 21, because soldering is used to secure the fixing portions of the membranes, the membranes are completely, reliably and tightly fixed. Therefore, leaking of the solution from the fixing portions can be completely prevented, thus avoiding the mixture of the stock solution with the treated solution and obtaining a high-purity treated solution.

In the embodiment mentioned above, the method of securing membranes to the retaining plates when the membranes are made into a module has been described, however, methods of securing the membranes are not limited to such an embodiment, since the membranes may be secured by any method. For instance, the membranes can be wound around core materials, and both ends of each membrane are secured by soldering. Though the membranes in the above embodiment are secured at the ends thereof, they may be secured by soldering at the centers thereof.

As has been described above, since the metallic layer is chemically bonded to the porous resin from the surface to the inside of the resin membrane, this invention is capable of providing a resin membrane which increases not only the bond strength between the resin membrane and the metallic layer, but also the amount of the metal coat. The resin membrane can be thoroughly electrically conducted. By performing electrolysis, the electrically-conductive resin membrane can be coated with another catalytic metal, like platinum. Furthermore, by coating a sufficient amount of the metallic layer onto the resin membrane, the pressure resistance, heat resistance and the solderability of the resin membrane can be made superior to those of the conventional art. Such a membrane can be conveniently made into a module.

The resin membrane of this invention can prevent static electricity from occurring, and therefore it can be used in a nonaqueous solution. Etching the resin membrane makes it simple for the metallic layer to be chemically bonded to the porous resin.

The metallic layers are formed on a plurality of membranes, and such metallic layers are secured by soldering. It is therefore possible to provide a membrane module so that the membranes can be completely secured to the module. The membranes can be secured easily and in a short period of time.

What is claimed is:

1. A resin membrane comprising:

a porous resin; and a metallic layer chemically bonded to the porous resin, wherein the pores of the resin are not blocked off by the metallic layer, the metallic layer chemically bonded to the porous resin coats the surface of the resin and penetrates into the pores of the porous resin and said porous resin has functional groups capable of being chemically bonded to said metallic layer.

2. A resin membrane according to claim 1, wherein said metallic layer comprises a catalytic metal chemically bonded to said porous resin and another metallic layer which is electrolessly treated and formed around the nucleus of the catalytic metal.

3. A resin membrane according to claim 2, wherein said catalytic metal is at least one selected from the group consisting of Pd and Sn.

4. A resin membrane according to claim 2, wherein said metallic layer which is electrolessly treated comprises at least one element selected from the group consisting of Ni, Co, Fe, Mo, W, Cu, Re, Au, and Ag.

5. A resin membrane according to claim 2, wherein a metallic layer which is electrolytically treated is formed on said metallic layer.

6. A resin membrane according to claim 5, wherein said metallic layer which is electrolytically treated comprises at least one element selected from the group consisting of Cr, Zn, Ag, Au, Pt, Al, Mn, Bi, Se, Te, Cd, Ir, Ti, and Ni.

7. A resin membrane according to claim 1, wherein said functional group is produced by an etching treatment.

8. A resin membrane according to claim 7, wherein said functional group comprises at least one group selected from the group consisting of a carbon radical, a carboxyl group, a carbonyl group, a hydroxyl group, a sulfone group, and a nitrile group.

9. A resin membrane according to claim 7, wherein said porous resin comprises at least one member selected from the group consisting of polyacrylonitrile, polyarylate, polysulfone, phenoxy resin, polyamide-imide, polyethersulfone, ABS, polyethylene, polypropylene, polyamide, polyetherimide, acrylic urethane, polymide, silicone resin, and cellulose resin.

10. A resin membrane according to claim 1, wherein said porous resin has prior to chemical bonding with the metallic layer a functional group capable of being chemically bonded to a metal.

11. A resin membrane according to claim 10, wherein said porous resin comprises polyacrylonitrile.

12. A resin membrane according to claim 1, wherein said porous resin is a hollow fiber membrane.

13. A resin membrane according to claim 1, wherein the amount of metal to be formed into the coating layer is $2.2 \times 10^{-3}$ to $15.0 \times 10^{-3}$ mol/m.

14. A resin membrane according to claim 1, wherein said metallic layer has a metal which produces at least one catalytic action selected from the group consisting of polymerization, cracking, hydrogenation, dehydrogenation, isomerization, and cyclization.

15. A resin membrane according to claim 1, wherein said porous resin has a resistivity ranging from 1 to 20 $\Omega$/cm.

16. A resin membrane according to claim 1, wherein said metallic layer is formed starting from a surface of said porous resin to an inside thereof, thus having a functional gradient.

17. A resin membrane according to claim 1, wherein a plurality of metallic layers are fixed on a plurality of porous resins by soldering.

18. A resin membrane according to claim 17, wherein the melting point of solder is lower than that of said porous resins.

19. A resin membrane according to claim 17, wherein the plurality of said porous resins are fixed to retaining plates, said metallic layers on said porous resins being fixed by soldering to the retaining plates.

20. A resin membrane according to claim 17, wherein said porous resin is a hollow fiber membrane.

* * * * *